United States Patent
Brown et al.

(10) Patent No.: US 9,218,398 B2
(45) Date of Patent: *Dec. 22, 2015

(54) CONTENT STORAGE MAPPING

(71) Applicant: International Business Machines Corporation, Armonk, NY (US)

(72) Inventors: William A. Brown, Raleigh, NC (US); Daniel D. Carr, Beaverton, OR (US); Richard W. Muirhead, Tyler, TX (US); Francis X. Reddington, Sarasota, FL (US); Martin A. Wolfe, Mooresville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/328,970

(22) Filed: Jul. 11, 2014

(65) Prior Publication Data

US 2014/0324909 A1    Oct. 30, 2014

Related U.S. Application Data

(63) Continuation of application No. 13/964,207, filed on Aug. 12, 2013, now Pat. No. 8,862,599, which is a continuation of application No. 13/448,511, filed on Apr. 17, 2012, now Pat. No. 8,554,777, which is a continuation of application No. 12/606,260, filed on Oct. 27, 2009, now Pat. No. 8,229,936.

(51) Int. Cl.
*G06F 7/00* (2006.01)
*G06F 17/30* (2006.01)

(52) U.S. Cl.
CPC .... *G06F 17/30539* (2013.01); *G06F 17/30029* (2013.01); *G06F 17/30292* (2013.01); *G06F 17/30342* (2013.01); *G06F 17/30997* (2013.01)

(58) Field of Classification Search
None
See application file for complete search history.

(56) References Cited

U.S. PATENT DOCUMENTS

| | | | |
|---|---|---|---|
| 6,236,994 B1 | 5/2001 | Swartz et al. |
| 7,457,279 B1 | 11/2008 | Scott et al. |
| 8,090,853 B2 | 1/2012 | Brown et al. |
| 8,229,936 B2 | 7/2012 | Brown et al. |
| 8,554,777 B2 | 10/2013 | Brown et al. |

(Continued)

OTHER PUBLICATIONS

Office Action (Mail Date Mar. 14, 2011) for U.S. Appl. No. 12/628,301, filed Dec. 1, 2009; Confirmation No. 5671.

(Continued)

*Primary Examiner* — Uyen Le
(74) *Attorney, Agent, or Firm* — Schmeiser, Olsen & Watts; Matthew Chung

(57) ABSTRACT

A data storage method and system. The method includes defining, by a computing system, a meta-object, a schema based structured definition for the meta-object, and a taxonomy with configuration data. The computing system creates content associated with the taxonomy and associates topics of the content with a logical storage room representations. Reference coordinates associated with the logical storage room representations are associated with the taxonomy. The computing system generates updated configuration data that includes the reference coordinates and a uniform resource identifier associated with the content is generated. The computing system generates an account associated with the meta-object for a user. Metering charges for usage of the account and a report associated with the account and usage are generated.

20 Claims, 15 Drawing Sheets

(56) References Cited

U.S. PATENT DOCUMENTS

| | | | |
|---|---|---|---|
| 8,862,599 | B2 | 10/2014 | Brown et al. |
| 2005/0055570 | A1 | 3/2005 | Kwan et al. |
| 2006/0106874 | A1 | 5/2006 | Victor et al. |
| 2006/0168253 | A1 | 7/2006 | Baba et al. |
| 2006/0224998 | A1 | 10/2006 | Riss et al. |
| 2007/0214499 | A1 | 9/2007 | Clymer et al. |
| 2009/0064285 | A1 | 3/2009 | Takahashi |
| 2009/0116458 | A1 | 5/2009 | Ramesh et al. |
| 2009/0125796 | A1 | 5/2009 | Day et al. |
| 2009/0168995 | A1 | 7/2009 | Banga et al. |
| 2009/0217353 | A1 | 8/2009 | Zheng |
| 2009/0282468 | A1 | 11/2009 | Banga et al. |
| 2010/0057924 | A1 | 3/2010 | Rauber et al. |
| 2010/0269155 | A1 | 10/2010 | Droms et al. |
| 2010/0299523 | A1 | 11/2010 | Henry et al. |
| 2011/0055299 | A1 | 3/2011 | Phillips |
| 2011/0099207 | A1 | 4/2011 | Brown et al. |
| 2011/0112952 | A1 | 5/2011 | Annunziata et al. |
| 2011/0131339 | A1 | 6/2011 | Brown et al. |
| 2012/0203802 | A1 | 8/2012 | Brown et al. |
| 2013/0332494 | A1 | 12/2013 | Brown et al. |

OTHER PUBLICATIONS

Amendment filed Jun. 3, 2011 in response to Office Action (Mail Date Mar. 14, 2011) for U.S. Appl. No. 12/628,301, filed Dec. 1, 2009; Confirmation No. 5671.
Notice of Allowance (Mail Date Aug. 17, 2011) for U.S. Appl. No. 12/628,301, filed Dec. 1, 2009; Confirmation No. 5671.
Amendment after Notice of Allowance (Rule 312) filed Nov. 16, 2011 for U.S. Appl. No. 12/628,301, filed Dec. 1, 2009; Confirmation No. 5671.
Response to Amendment under Rule 312 (Mail Date Nov. 22, 2011) for U.S. Appl. No. 12/628,301, filed Dec. 1, 2009; Confirmation No. 5671.
Office Action (Mail Date Nov. 23, 2011) for U.S. Appl. No. 12/606,260, filed Oct. 27, 2009; Confirmation No. 2427.
Amendment filed Dec. 21, 2011 in response to Office Action (Mail Date Nov. 23, 2011) for U.S. Appl. No. 12/606,260, filed Oct. 27, 2009; Confirmation No. 2427.
Notice of Allowance (Mail Date Mar. 15, 2012) for U.S. Appl. No. 12/606,260, filed Oct. 27, 2009; Confirmation No. 2427.
Atkinson et al.; Distributed Architecture for Data Mining and Integration; DADC'09, Jun. 9-10, 2009; Munich, Germany; 10 pages.
Office Action (Mail Date Feb. 28, 2013) for U.S. Appl. No. 13/448,511, filed Apr. 17, 2012; Confirmation No. 2697.
Amendment filed Mar. 21, 2013 in response to Office Action (Mail Date Feb. 28, 2013) for U.S. Appl. No. 13/448,511, filed Apr. 17, 2012; Confirmation No. 2697.
Notice of Allowance (Mail Date May 24, 2013) for U.S. Appl. No. 13/448,511, filed Apr. 17, 2012; Confirmation No. 2697.
Office Action (Mail Date Jan. 16, 2014) for U.S. Appl. No. 13/964,207, filed Aug. 12, 2013; Confirmation No. 5444.
Amendment filed Mar. 21, 2014 in response to Office Action (Mail Date Jan. 16, 2014) for U.S. Appl. No. 13/964,207, filed Aug. 12, 2013; Confirmation No. 5444.
Notice of Allowance (Mail Date Jun. 6, 2014) for U.S. Appl. No. 13/964,207, filed Aug. 12, 2013; Confirmation No. 5444.

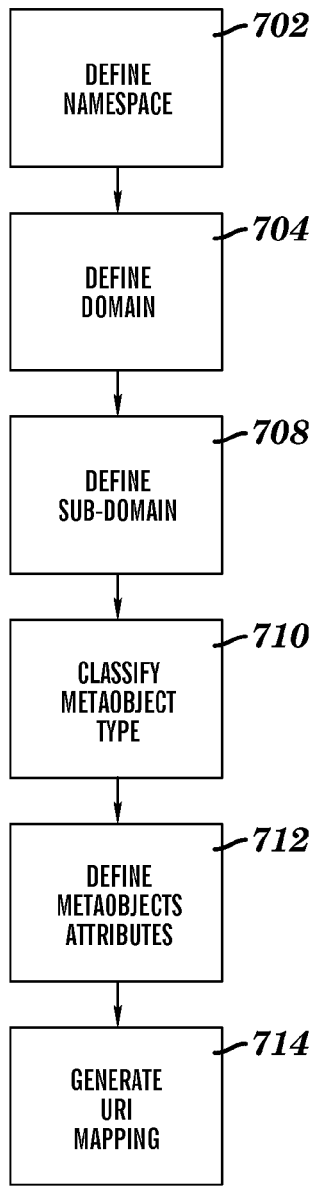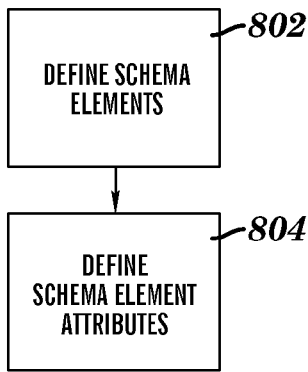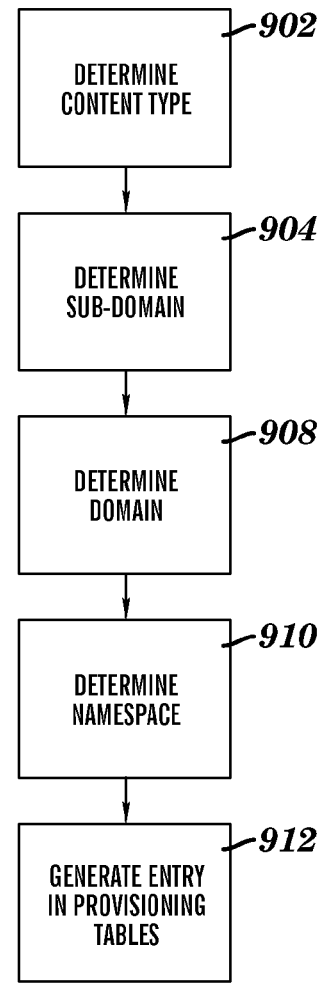
FIG. 7
FIG. 8
FIG. 9

CONTENT STORAGE MAPPING

This application is a continuation application claiming priority to Ser. No. 13/964,207 filed Aug. 12, 2013, now U.S. Pat. No. 8,862,599, issued Oct. 14, 2014, which is a continuation application claiming priority to Ser. No. 13/448,511 filed Apr. 17, 2012, now U.S. Pat. No. 8,554,777, issued Oct. 8, 2013; which is a continuation application claiming priority to Ser. No. 12/606,260, filed Oct. 27, 2009, now U.S. Pat. No. 8,229,936, issued Jul. 24, 2012.

FIELD

The present invention relates to a method and associated system for storing and retrieving distributed data.

BACKGROUND

Accessing information typically comprises an inefficient process with little flexibility. Systems are typically required to access and view information at a single location which may be inefficient. Accessing information at a single location at a single time may be very time consuming.

SUMMARY

The present invention provides a method comprising: defining, by a computing system, a user accessible meta-object referencing contextual content, wherein said user accessible meta-object comprises a functional operation referenced object, a service referenced object, or a content specific referenced object; defining, by said computing system, a schema based structured definition for said user accessible meta-object; defining, by said computing system from said schema based structured definition, a predefined user access content mapped hierarchical taxonomy and a configuration data map associated with said predefined user access content mapped hierarchical taxonomy; determining, by said computing system, that content is required for said computing system; creating, by a processor of said computing system, said content, wherein said content comprises user accessible contextual content associated with said predefined user access content mapped hierarchical taxonomy; associating, by said computing system, user accessible topics of relevant tangible content of said content with specified logical storage room representations, wherein each storage room of said specified logical storage room representations comprises contextual content storage address spaces; associating, by said computing system, reference coordinates with said predefined user access content mapped hierarchical taxonomy, wherein said reference coordinates are associated with said specified logical storage room representations; determining, by said computing system, a change associated with a relative point of view associated with each node of said predefined user access content mapped hierarchical taxonomy; updating, by said computing system, said configuration data map, wherein said updating said configuration data map comprises generating updated configuration data, wherein said updated configuration data comprises reference coordinate pointers pointing to the contextual content storage address spaces, and wherein the contextual content storage address spaces are comprised by a plurality of different storage mediums and a plurality of different physical storage locations; generating, by said computing system, a uniform resource identifier (URI) associated with said content enabling a direct internal access mapping to the contextual content storage address spaces associated with said reference coordinate pointers; determining, by said computing system, metering charges for usage of an account per paid subscription to the user accessible contextual content; applying, by said computing system, key performance indicators to transactional analysis usage patterns of said user accessible contextual content; generating, by said computing system, a report associated with said account and said usage; and storing, by said computing system, said report.

The present invention provides a computing apparatus comprising a processor coupled to a computer-readable memory unit, said memory unit comprising instructions that when executed by the processor implements a method comprising: defining, by said computing system, a user accessible meta-object referencing contextual content, wherein said user accessible meta-object comprises a functional operation referenced object, a service referenced object, or a content specific referenced object; defining, by said computing system, a schema based structured definition for said user accessible meta-object; defining, by said computing system from said schema based structured definition, a predefined user access content mapped hierarchical taxonomy and a configuration data map associated with said predefined user access content mapped hierarchical taxonomy; determining, by said computing system, that content is required for said computing system; creating, by a processor of said computing system, said content, wherein said content comprises user accessible contextual content associated with said predefined user access content mapped hierarchical taxonomy; associating, by said computing system, user accessible topics of relevant tangible content of said content with specified logical storage room representations, wherein each storage room of said specified logical storage room representations comprises contextual content storage address spaces; associating, by said computing system, reference coordinates with said predefined user access content mapped hierarchical taxonomy, wherein said reference coordinates are associated with said specified logical storage room representations; determining, by said computing system, a change associated with a relative point of view associated with each node of said predefined user access content mapped hierarchical taxonomy; updating, by said computing system, said configuration data map, wherein said updating said configuration data map comprises generating updated configuration data, wherein said updated configuration data comprises reference coordinate pointers pointing to the contextual content storage address spaces, and wherein the contextual content storage address spaces are comprised by a plurality of different storage mediums and a plurality of different physical storage locations; generating, by said computing system, a uniform resource identifier (URI) associated with said content enabling a direct internal access mapping to the contextual content storage address spaces associated with said reference coordinate pointers; determining, by said computing system, metering charges for usage of an account per paid subscription to the user accessible contextual content; applying, by said computing system, key performance indicators to transactional analysis usage patterns of said user accessible contextual content; generating, by said computing system, a report associated with said account and said usage; and storing, by said computing system, said report.

The present invention provides a computer program product, comprising a computer readable storage device storing a computer readable program code, said computer readable program code configured to perform method upon being executed by a computer processor of a computing system, said method comprising: defining, by said computing system, a user accessible meta-object referencing contextual content, wherein said user accessible meta-object comprises a functional operation referenced object, a service referenced object, or a content specific referenced object; defining, by said computing system, a schema based structured definition for said user accessible meta-object; defining, by said computing system from said schema based structured definition, a predefined user access content mapped hierarchical taxonomy and a configuration data map associated with said predefined user access content mapped hierarchical taxonomy; determining, by said computing system, that content is required for said computing system; creating, by a processor of said computing system, said content, wherein said content comprises user accessible contextual content associated with said predefined user access content mapped hierarchical taxonomy; associating, by said computing system, user accessible topics of relevant tangible content of said content with specified logical storage room representations, wherein each storage room of said specified logical storage room representations comprises contextual content storage address spaces; associating, by said computing system, reference coordinates with said predefined user access content mapped hierarchical taxonomy, wherein said reference coordinates are associated with said specified logical storage room representations; determining, by said computing system, a change associated with a relative point of view associated with each node of said predefined user access content mapped hierarchical taxonomy; updating, by said computing system, said configuration data map, wherein said updating said configuration data map comprises generating updated configuration data, wherein said updated configuration data comprises reference coordinate pointers pointing to the contextual content storage address spaces, and wherein the contextual content storage address spaces are comprised by a plurality of different storage mediums and a plurality of different physical storage locations; generating, by said computing system, a uniform resource identifier (URI) associated with said content enabling a direct internal access mapping to the contextual content storage address spaces associated with said reference coordinate pointers; determining, by said computing system, metering charges for usage of an account per paid subscription to the user accessible contextual content; applying, by said computing system, key performance indicators to transactional analysis usage patterns of said user accessible contextual content; generating, by said computing system, a report associated with said account and said usage; and storing, by said computing system, said report.

The present invention advantageously provides a simple method and associated system capable of saving information.

BRIEF DESCRIPTION OF THE DRAWINGS

FIG. 2 including

FIGS. 7-15 illustrate flowcharts detailing various steps of the algorithm of FIG. 5, in accordance with embodiments of the present invention.

DETAILED DESCRIPTION

Figure 1:
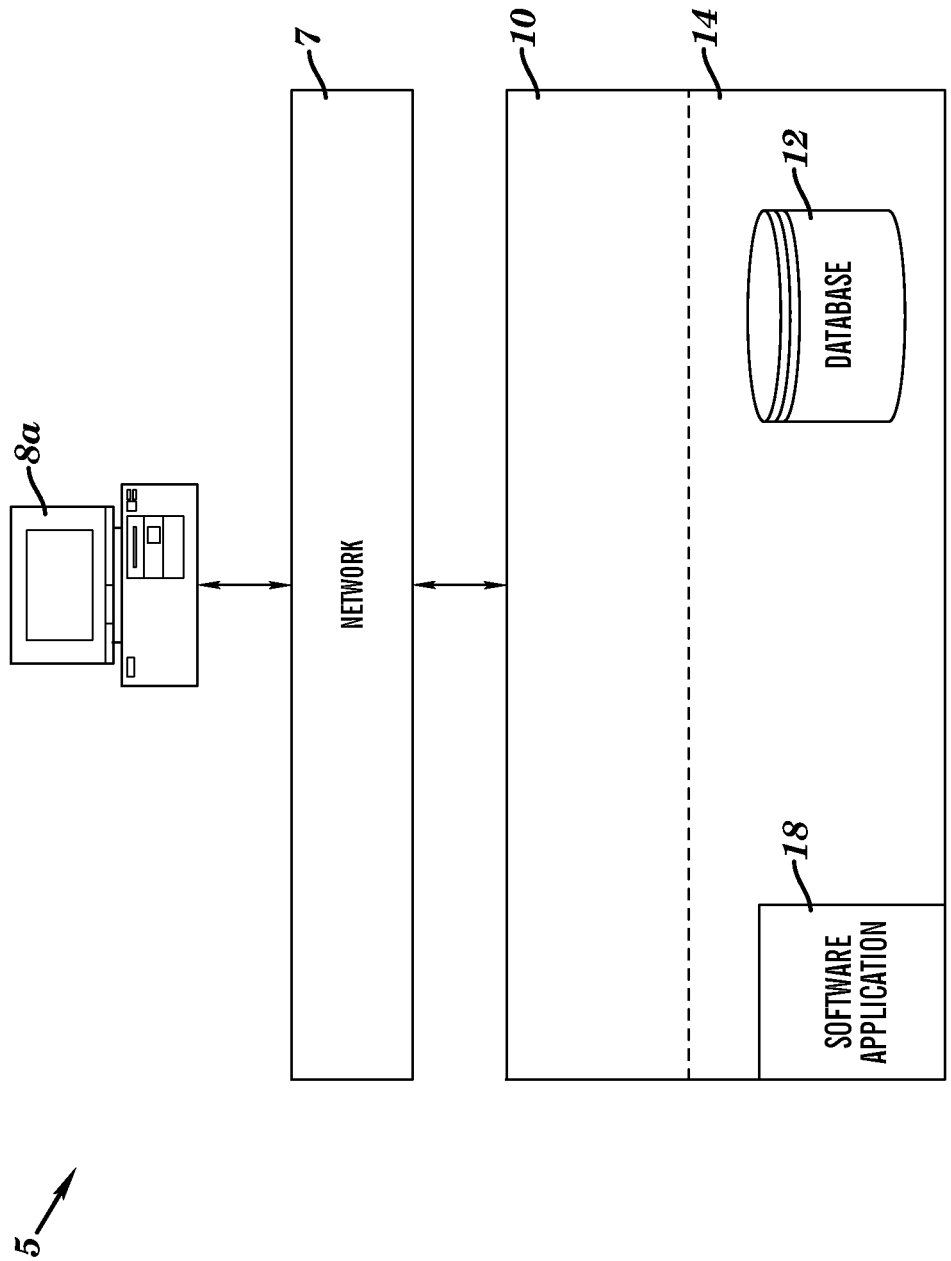
FIG. 1 illustrates a system for storing and retrieving distributed data, in accordance with embodiments of the present invention.

FIG. 1 illustrates a system 5 for storing and retrieving distributed data, in accordance with embodiments of the present invention. System 5 comprises a distributed object-oriented retrieval and storage (DOORS) system for providing (i.e., via a data access layer as described and defined, infra) a single universal interface that provides access to tangible related data (from a plurality of different types of storage mediums and different physical storage locations) from a same intersected base topic. The DOORS system provides a universal 3 dimensional (3D) relative positioning interface to a framework that enables a standardized means of simultaneous access, retrieval, storage, and management capabilities of diverse and federated data sources (i.e., content storage address spaces for data are comprised by different storage mediums and different physical storage locations). A shared address space points to multiple different storage mediums and physical storage locations. A data access layer (i.e., as illustrated and described in detail with respect to FIG. 20, infra) comprises three sub-layers:

1. A DOORS access-bus (H1) via REST (representational state transfer architectural style for large scale software design) style addressing.
2. DOORS data access logic components (H2).
3. A DOORS service agent component (H3).

Each one of the sub-layers (H1, H2, and H3) enables separate discrete responsibilities. Collectively the sub-layers (H1, H2, and H3) provide a unique means of providing simultaneous multi-dimensional perspective storage and retrieval capabilities of a referenced user accessible meta-object (resource) associated with contextual related content (retrieved simultaneously) from a plurality of different storage mediums and different physical storage locations. A user accessible meta-object is defined herein as a functional operation, a service, or a content specific referenced object that may be assessed by a user.

System 5 provides a single reference point (point of view as described in detail with respect to FIGS. 3 and 4, infra) allowing simultaneous access to multiple pointers that point to multiple address spaces (associated with a plurality of different storage mediums and different physical storage locations) each comprising different data as opposed to a single reference point allowing access to only one pointer that points to only a single address space associated with a single storage medium or location. A virtual data architectural data layer (e.g., see FIGS. 2 and 20) provides a standardized integration system to expose data as a service. System 5 provides a common means to integrate to all forms of data resources and data flowing through an enterprise operation environment by providing a commonly referenced interface thereby allowing system 5 to:

1. Enable an organization a capability to leverage valid data across applications and operational domains in real-time.
2. Provide a common means to manage provisioning of traditional and non-traditional logical and physical storage resources.
3. Provide a common means of metering and cost accounting for usage of data and logical (and physical) storage resources.

System 5 of FIG. 1 comprises a computing apparatus 8a connected to a computing system 10 through a network 7. Network 7 may comprise any type of network including, inter alia, a local area network, (LAN), a wide area network (WAN), the Internet, etc. Computing apparatus 8a may comprise any type of computing apparatus including, inter alia, a personal computer, a laptop computer, a computer terminal, etc. Computing apparatus 8a may comprise a single computing apparatus or a plurality of computing apparatuses. Computing apparatus 8a is used by end users for communicating with (e.g., entering data) computing system 10. Computing system 10 may comprise any type of computing system(s) including, inter alia, a personal computer (PC), a server computer, a database computer, etc. Computing system 10 is used to store (and retrieve data from computing apparatus 8a). Computing system 10 may comprise a multi-sourced user accessible context and content driven data access computer comprising an application architectural component that performs the work of intelligent retrieval and storage and navigation coordination of contextual content from multiple storage locations and types. Computing system 10 comprises a memory system 14. Memory system 14 may comprise a single memory system. Alternatively, memory system 14 may comprise a plurality of memory systems. Memory system 14 comprises a software application 18 and a database 12. Database 12 may comprise multiple databases. Database 12 comprises all retrieved data (i.e., retrieved from computing apparatus 8a) and any generated data (e.g., data layer model 200 as described with respect to FIG. 2). System 5 comprises a DOORS system providing a universal natural 3D relative positioning (i.e., X, Y, Z axis type storage as described with respect to FIGS. 3 and 4) interface to a framework that enables a standardized means of access, retrieval, storage, and management capabilities of diverse and federated data sources (i.e., a plurality of different storage mediums and different physical storage locations) across an enterprise model through a virtual architectural data access layer. Additionally, a 3D relative positioning of a specific area of a topic enables a user to pivot and transverse to its semantic relationships along an X, Y, and Z axis (i.e., a single point of view pointing to multiple pointers X, Y, and Z). System 5 enables a single intersection point between the X, Y, and Z axis to hold a different value depending on a perspective of a relative point of view. The DOORS system allows for increased storage capacity of various data at a same address space depending on a point of view perspective.

Software application 18 enables the following functions associated with data storage and retrieval:

1. Providing a single common style 3D spatial interface to enterprise data storage and retrieval.
2. Providing a single common style 3D spatial interface to enterprise data management.
3. Using a standardized REST Style resource addressing notation.
4. Enabling data integration across logical and physical barriers (i.e., across a plurality of different storage mediums and different physical storage locations).
5. Enabling fully extensive enterprise data integration, thereby creating hybrid information assets.
6. Enabling a basic standard for metering and cost accounting resources.
7. Enabling a standard base measurement unit for monitoring.
8. Enable multiple translation of a same reference point, depending on a perspective of point of view (POV).
9. Allowing a multi-perspective 3D Point of view design to be translated to a logical multiple layer storage translation at a shared address space (i.e., a shared address space points to multiple different storage mediums and physical storage locations).
10. Enabling persisted information (i.e., regardless of how it is stored) to be readily addressable, accessible, and potentially consumed by all integrated services (both internal and external) across all application layers depending on applied security controls.

Figure 2A:
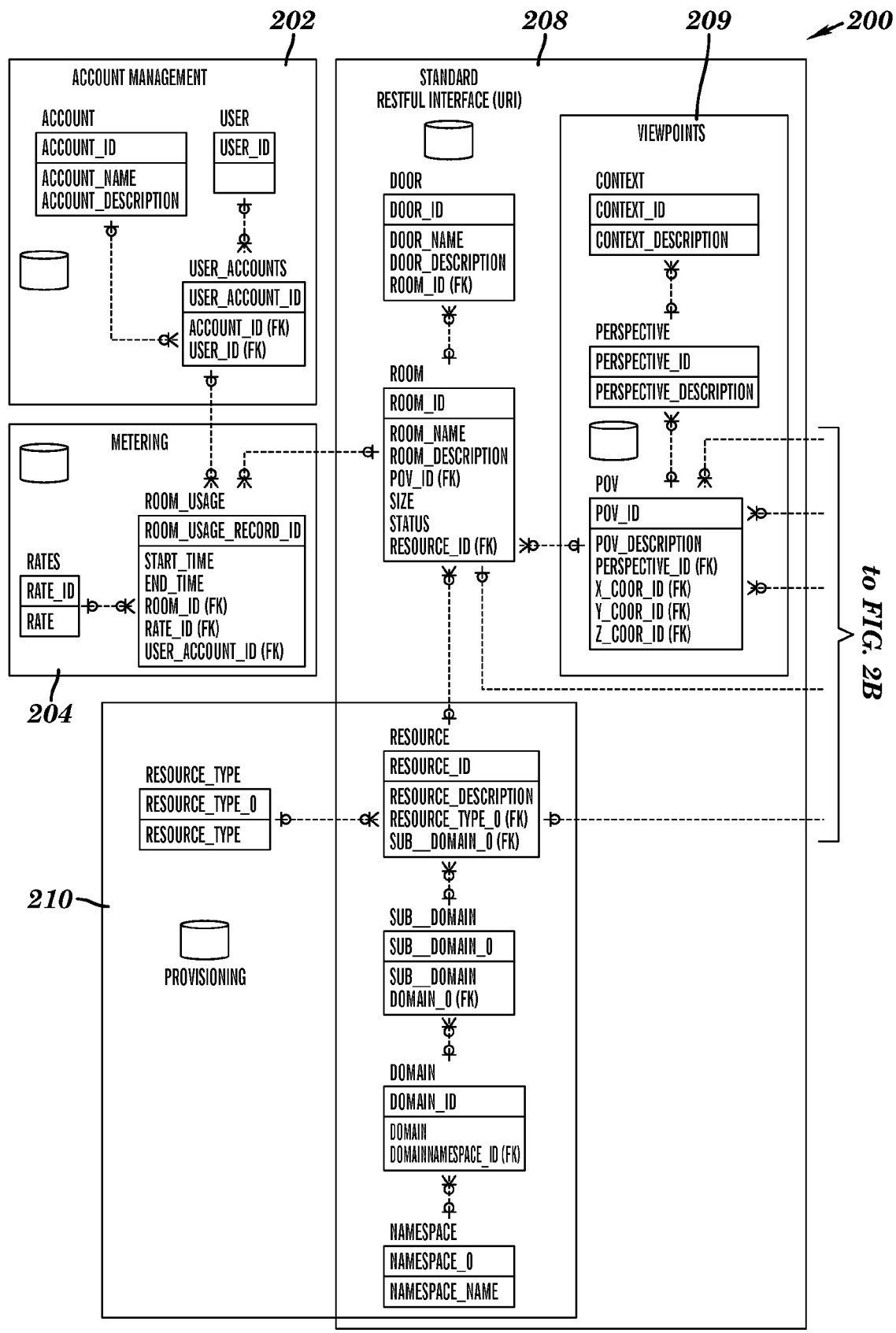
FIGS. 2A-2C, illustrates a data (layer) model, in accordance with embodiments of the present invention.
Figure 2B:
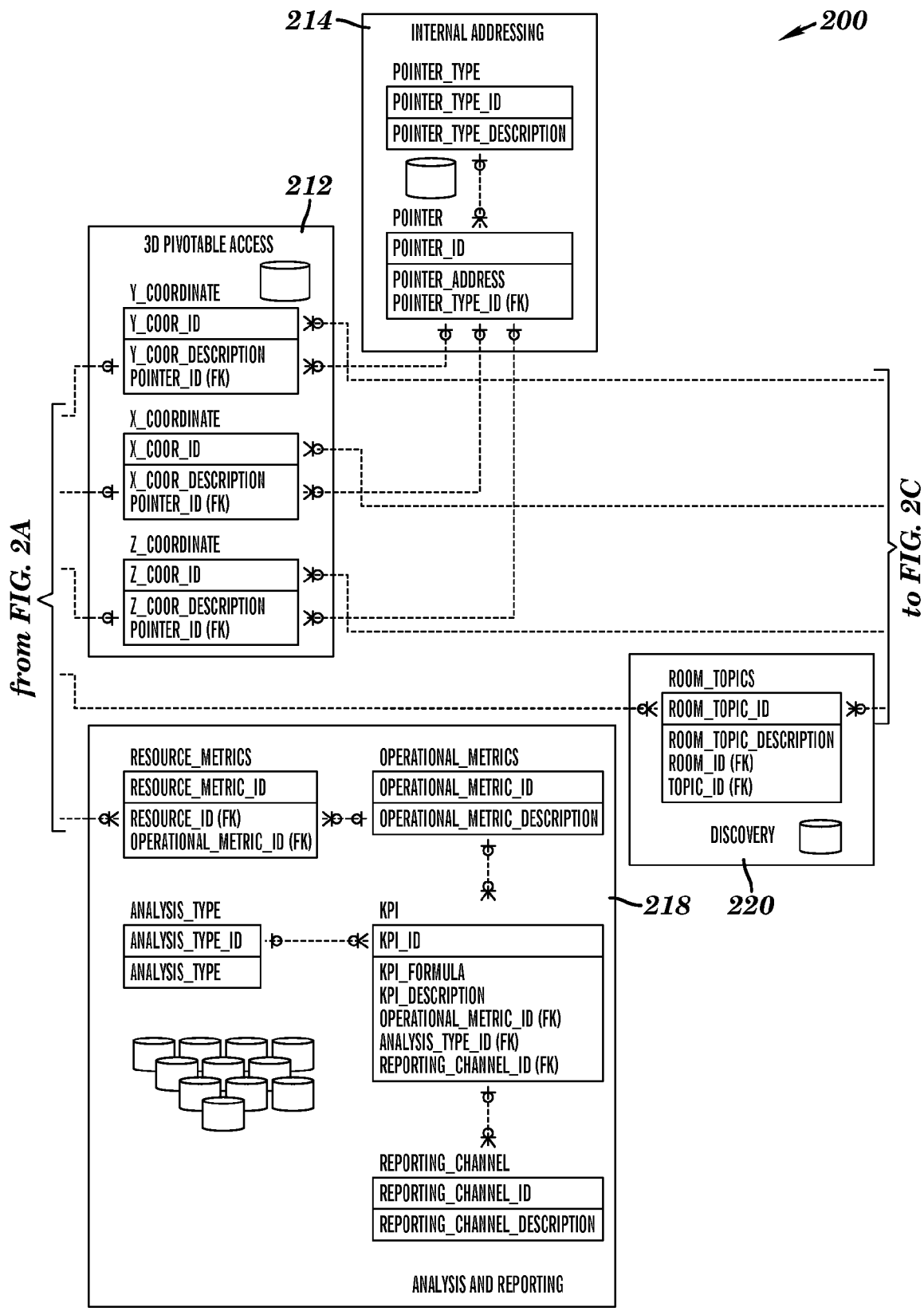
Figure 2C:
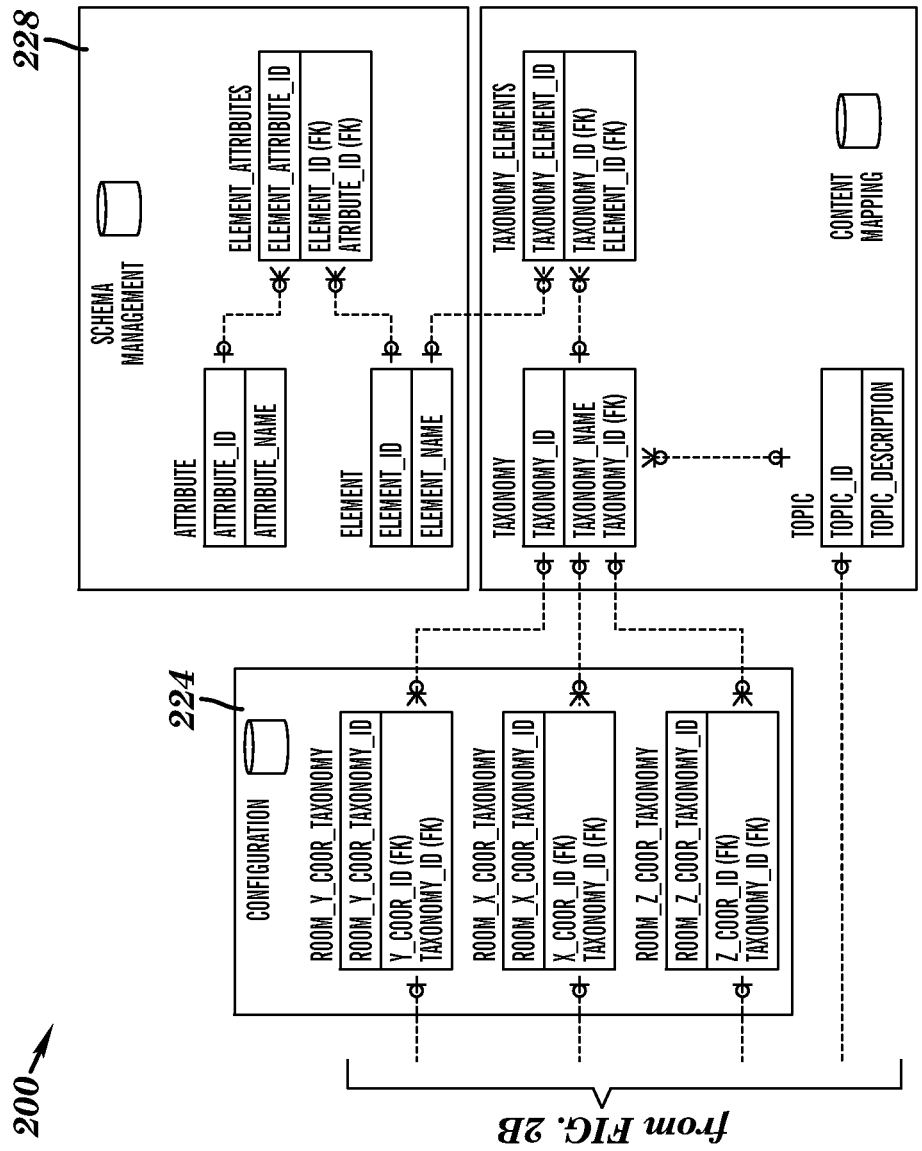

FIG. 2 including FIGS. 2A-2C, illustrates a data access (layer) model 200, in accordance with embodiments of the present invention. Data model 200 in FIG. 2 comprises a graphical representation of a DOORS data model. Data model 200 comprises the following components:

1. An account management component 202 for enabling management of user accounts through creation of users, accounts, and mapping of meta-objects (i.e., a reference object characterized by information) associated with use of an account.
2. A metering component 204 for enabling rates to be applied to usage of content related meta-objects based on access time to a logical data storage room. A logical data storage room is defined herein as a local representation of a meta-object storage container (comprised by multiple different storage mediums and physical storage locations) and is characterized by an associated topic.
3. A provisioning component 210 for allocating meta-objects and logical storage room representations comprised by multiple different storage mediums and physical storage locations (i.e., defined within a namespace, a domain, and a sub-domain) based on existing availability.
4. A representation state transfer (REST) interface 208 for exposing meta-objects through an infinite number of uniform resource identifiers (i.e., URI) thereby enabling the DOORS system an addressability to scale accordingly with newly added provisioned meta-objects.
5. A viewpoints component 209 for enabling a multi-perspective filtering of a POV (i.e., X, Y, Z) content reference with applied context (e.g., who, what, where, when, how, why, etc).
6. A 3D Pivotable Access component 212 for represents X, Y, Z coordinates and associated pointers to content (i.e., address spaces).
7. An internal addressing component 214 for keeping track of internal pointers to content regardless of pointer type (e.g., pointer to file, pointer to column, pointer to memory address, etc) and storage type.
8. A configuration component 224 for generating mapping to between X, Y, Z coordinates and locations on a predefined user access content mapped hierarchal taxonomy.
9. A schema management component 228 for enabling a creation and management of defined schema based structure definitions used to define a hierarchical structure of a meta-object relationship.

10. A discovery component 220 for enabling mapping of topics to logical storage room representations and generating a searchable record entry within a discovery data store.
11. An analysis & reporting component 218 for enabling an association of operational metrics and key performance indicators (KPI) to be applied via transactional analysis usage patterns of all DOORS related data and the reporting of analysis through defined reporting channels (e.g., reports, dashboards, messaging, etc).

Figure 3:
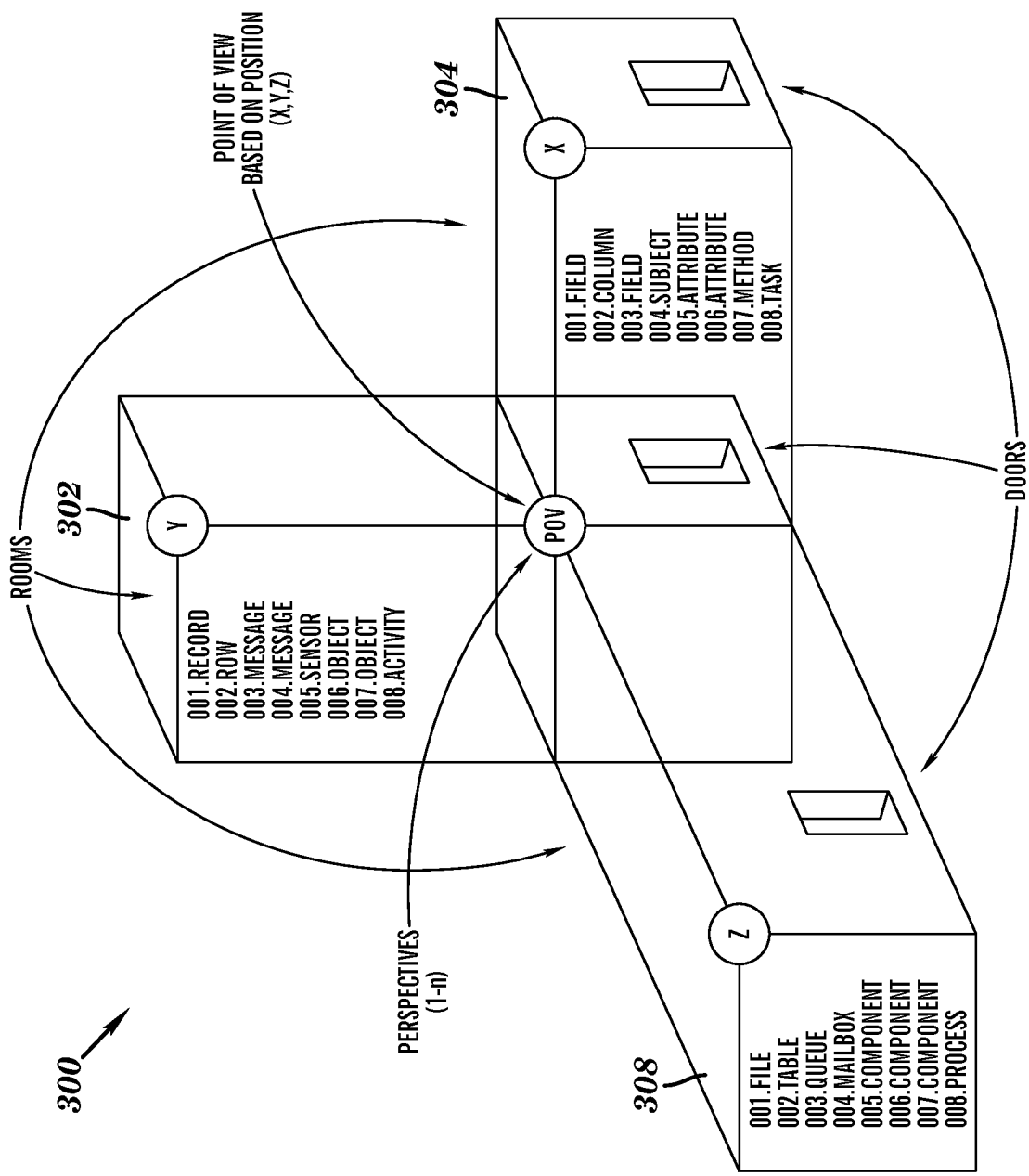
FIGS. 3 and 4 illustrate an implementation example for enabling the system of FIG. 1 to represent hierarchal taxonomies as a relative point of view, in accordance with embodiments of the present invention.
Figure 4:
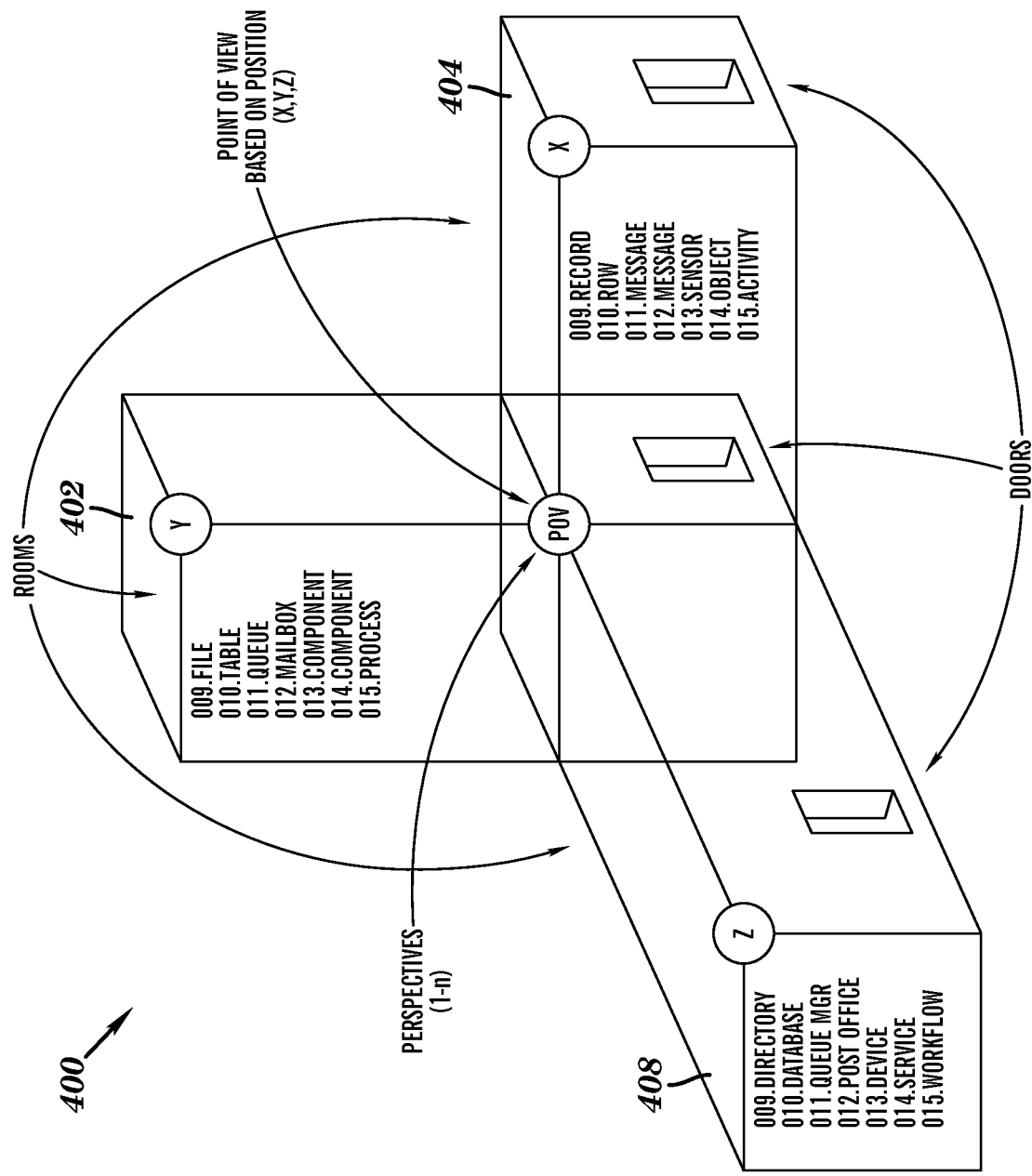

FIGS. 3 and 4 illustrate an implementation example for enabling system 5 of FIG. 1 to represent hierarchal taxonomies as a relative point of view, in accordance with embodiments of the present invention. In FIGS. 3 and 4, data retrieval, storage, and data resource management planning (e.g., procurement, provisioning, capacity planning, space management etc.) are each represented in separate hierarchical taxonomies. Each node on the taxonomy represents a logical storage room representation comprised by a plurality of different storage mediums and physical storage locations (e.g., see rooms 302, 304, and 308 in FIG. 3 or rooms 402, 404, and 408 in FIG. 4). This hierarchical taxonomy is segmented by its interdependency relationship intersections to other taxonomies. The enumerated items (e.g., 001, 002, 003 in FIG. 3 or 009, 010, 011, etc in FIG. 4) in FIGS. 3 and 4 represent separate parent taxonomies (address spaces). As a user navigates through taxonomies topics, the user navigates between rooms 302, 304, and 308 or rooms 402, 404, and 408. The term DOORS is used metaphorically as entry point into each of the rooms via a standardized interface. Upon entering a room, the user has a relative 3D (simultaneous) point of view (spatial definition) which represents a three point intersection (i.e., X, Y, Z coordinates or pointers) on 3 different related intersection taxonomy nodes that point to 3 different address spaces. As the user progresses through each node on the taxonomy (i.e., a room), a relative point of view (POV) changes. A view from a point of view depends upon the user's perspective. A user may be in multiple storage room representations (i.e., different storage mediums and physical storage locations) simultaneously supporting multiple perspectives (i.e., for address spaces) from a single point of view. This will exponentially enable the integration of various perspective points of views (i.e., to different address spaces) in data processing.

FIG. 3 illustrates a logical diagram 300 comprising X, Y, Z, coordinates (i.e., spatial definition reference points to different pointers) and a multi-dimensional perspective (1-n) point of view. For example, hierarchal relationships illustrated in FIG. 3 include the following address spaces that may be simultaneously accessed via multiple pointers X, Y, and Z from a single POV:

001—Files consisting of records and records consisting of fields.
002—Tables consisting of rows and rows consisting of columns.
003—Queues containing messages and messages containing fields.
004—Mailbox containing messages. A message may contain subjects.
005—Smart physical component comprise sensors. Sensors read and store attributes.
006—Software components contain objects that comprise attributes.
007—Software components contain objects comprising methods.
008—A process comprises one or more activities having one or more tasks.

As an example, address space 001.Field (i.e., on the X-axis or pointer), address space 001.Record (i.e., on the Y-axis or pointer), and address space 001.File (i.e., on the Z-axis or pointer) may be simultaneously viewed and accessed.

Logical diagram 300 represents three dimensional planes (i.e., Y plane 302 of a room, an X plane 304 of a room, and a Z plane 308 of a room) of a logical storage room representation. A room is defined herein as a logical reference to a specific topic that a user would have access to use within system 5 of FIG. 1. X, Y, and Z coordinates in logical diagram 300 represent each dimensional plane of a three dimensional POV (i.e., Y plane 302 of a room, an X plane 304 of a room, and a Z plane 308 of a room). Collectively, a combination of X, Y, and Z coordinates represent a specified POV within a viewing space. Enumerated subject areas (001-008) are defined differently for each dimensional plane (X, Y, and Z) of a user accessible topic (i.e., room). For example, if a Topic of a Room is "Smart Devices", subject areas 005 represent a multi-dimensional hierarchical relationship of content relevant to the topic "Smart Devices". For Example: Z(005) subject area comprises a referenced component within a smart device, Y(005) comprises a sensor within the component, and X(005) comprises defined attributes of the sensors. In this example (i.e., in reference to this room), as the user moves along the Z axis, he/she moves between various components. As the user moves along the Y axis, his/her references to specific a sensor changes. As the user moves along the X axis his/her references to sensor attributes changes. Therefore in this example, the point of view (POV) would represent a specific attribute within a specific sensor within a certain component being referenced with the topic of smart devices.

FIG. 4 illustrates X, Y, Z, coordinates (i.e., spatial definition reference points) and a multi-dimensional perspective (1-n) point of view. For example, hierarchal relationships illustrated in FIG. 4 include the following address spaces that may be simultaneously accessed via multiple pointers X, Y, and Z from a single POV:

009—Directory consisting of files and files consisting of records.
010—Database consisting of tables and tables consisting of rows.
011—A queue manager coordinates queue and queue coordinate messages.
012—An electronic post office contains mailboxes comprising messages.
013—A smart physical device comprising smart physical components having sensors.
014—A service exposes a software component consisting of objects.
015—Workflows contain staged processes.

As an example, address space 009.Record (i.e., on the X-axis or pointer), address space 009.File (i.e., on the Y-axis or pointer), and address space 009.Directory (i.e., on the Z-axis or pointer) may be simultaneously viewed and accessed.

Logical diagram 400 represents three dimensions (i.e., Y plane 402 of a room, an X plane 404 of a room, and a Z plane 408 of a room) of a logical storage room representation. For example, if a Topic of a Room is "Smart Grid", subject areas 005 represent a multi-dimensional hierarchical relationship of content relevant to the topic "Smart Grid". In this example, Z(005) subject area comprises a referenced smart device within the "Smart Grid", Y(005) comprises a component within the smart device, and X(005) comprises a sensor with the component. Logical diagram 400 of FIG. 4 represents a next level within a hierarchical taxonomy of related content between rooms. Taxonomies exist within room and between rooms and as the user moves between rooms, they traverse through adjoining taxonomies. Within rooms, configuration data provides cross reference mapping of the X, Y, and Z coordinates to multi-dimensional subject areas as defined with room taxonomies. The DOORS system manages this level of complexity and simultaneous multi-dimensional navigational access through its unique data access layer.

Additionally, FIGS. 3 and 4 may be used to represent a physical use of a DOORS system.

As a first example, physical disk drives have tracks and cylinders. In a DOORS system, a disk may represent a Z axis, a cylinder may represent a Y axis, and tracks may represent an X axis.

As a second example, an aggregation of storage devices into a storage access network (SAN) may include a SAN representing a Z axis reference, a list of storage devices within the SAN representing a Y axis reference, and a disk within the storage device representing an X axis reference. A SAN comprises an architecture to attach remote computer storage devices (such as disk arrays, tape libraries, and optical jukeboxes) to servers in such a way that the devices appear as locally attached to the operating system. A SAN as described in the second example enables multiple translation of a same reference point, depending on a perspective of point of view (POV). A multi-perspective 3D Point of view design may be translated to a logical multiple layer storage translation at a shared address space and increase storage capacity with the use of more sophisticated translation pointers.

Figure 5:
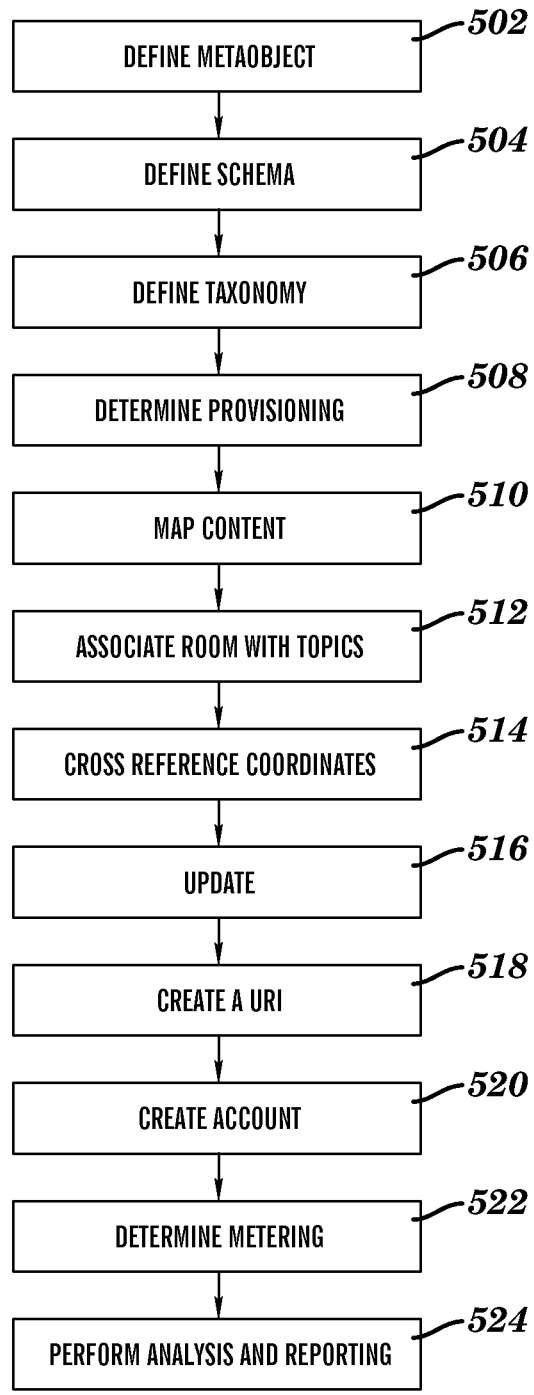
FIG. 5 illustrates a flowchart describing an algorithm used by the system of FIG. 1 for enabling a process for storing and retrieving distributed data, in accordance with embodiments of the present invention.

FIG. 5 illustrates a flowchart describing an algorithm used by system 5 of FIG. 1 for enabling a process for storing and retrieving distributed data simultaneously across multiple data storage mediums and different physical storage locations, in accordance with embodiments of the present invention. In step 502, a computing system (e.g., computing system 5 of FIG. 1) defines a user accessible meta-object referencing contextual content. The user accessible meta-object may comprise a functional operation related to a functional operation object, a service object or a content specific referenced object. In step 504, the computing system defines a schema based structured definition for the user accessible meta-object. In step 506, computing system defines (i.e., from the schema based structured definition) a predefined user access content mapped hierarchical taxonomy and a configuration data map associated with the predefined user access content mapped hierarchical taxonomy. In step 508, the computing system determines that content is required for the computing system and creates the content (i.e., comprising user accessible contextual content associated with the predefined user access content mapped hierarchical taxonomy). In step 510, the content is associated with the content mapped hierarchical taxonomy. In step 512, the computing system associates user accessible topics of relevant tangible content of the content with specified logical storage room representations comprising contextual content storage address spaces. In step 514, the computing system associates reference coordinates with the predefined user access content mapped hierarchical taxonomy. The reference coordinates are associated with the specified logical storage room representations. In step 516, the computing system updates the configuration data map. The updating process includes generating updated configuration data. The updated configuration data comprises reference coordinate pointers pointing to the contextual content storage address spaces. The contextual content storage address spaces are comprised by a plurality of different storage mediums and a plurality of different physical storage locations. In step 518, the computing system generates a uniform resource identifier (URI) associated with the content.

The URI is associated with the content and enables a direct internal access mapping to the contextual content storage address spaces associated with the reference coordinate pointers. In step 520, the computing system generates an account for a user. The account is associated with the user accessible meta-object. In step 522, the computing system determines metering charges for usage of the account. In step 524, the computing system analyzes the account and the usage and generates and stores a report associated with the analysis.

Figure 6:
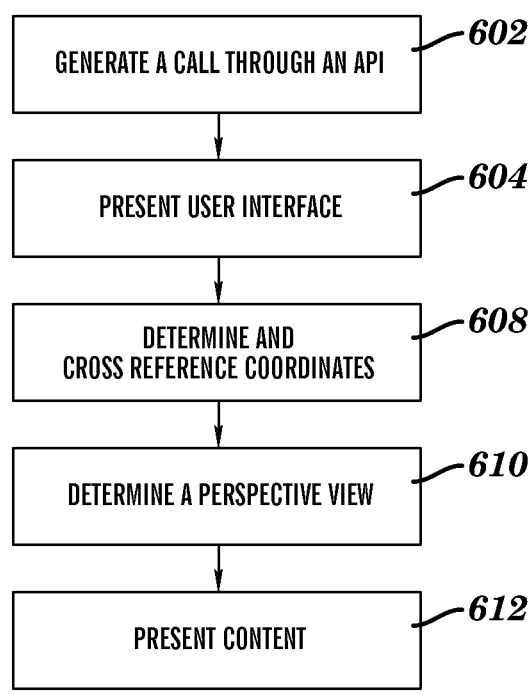
FIG. 6 illustrates a flowchart describing an algorithm used by the system of FIG. 1 for enabling a process for accessing distributed data, in accordance with embodiments of the present invention.

FIG. 6 illustrates a flowchart describing an algorithm used by system 5 of FIG. 1 for enabling a process for simultaneously accessing distributed data across multiple data storage mediums and different physical storage locations, in accordance with embodiments of the present invention. In step 602, a computing system (e.g., computing system 5 of FIG. 1) generates a call through an application program interface (API) and determines (i.e., using the API in response to the call) an internal functionality of the computing system. In step 604, the computing system presents (in response to the call) a user accessible content filter perspective user interface to a user and receives (from the user through the user accessible content filter perspective user interface) known user accessible input data associated with specified user accessible filter perspective content. In step 608, the computing system determines (in response to the known user accessible input data) a plurality of address space coordinates cross-referenced to the specified user accessible filter perspective content. Additionally, the computing system simultaneously retrieves (i.e., from a plurality of different storage sources in response to the plurality of address space coordinates) the specified user accessible filter perspective content. In step 610, the computing system determines (in response the known user accessible input data) a specified filtered perspective for viewing the specified user accessible filter perspective content. In step 612, the computing system presents to the user, the specified user accessible filter perspective content using the specified perspective.

FIG. 7 illustrates a flowchart detailing step 502 of the algorithm of FIG. 5, in accordance with embodiments of the present invention. In step 702, the computing system defines a namespace for the user accessible meta-object. In step 704, the computing system defines a domain for the namespace. In step 708, the computing system defines a sub-domain associated with the domain. In step 710, the computing system classifies a type for the user accessible meta-object. In step 712, the computing system defines attributes for the user accessible meta-object. In step 714, the computing system generates mapping data associated with the URI.

FIG. 8 illustrates a flowchart detailing step 504 of the algorithm of FIG. 5, in accordance with embodiments of the present invention. In step 802, the computing system defines elements associated with the schema based structured definition. In step 804, the computing system defines attributes associated with the elements.

FIG. 9 illustrates a flowchart detailing step 508 of the algorithm of FIG. 5, in accordance with embodiments of the present invention. In step 902, the computing system determines a content type for the content. In step 904, the computing system determines a sub-domain associated with the user accessible meta-object. In step 908, the computing system determines a domain associated with the sub-domain. In step 910, the computing system determines a namespace (i.e., an identifier specifying a location in storage) associated with the domain. In step 912, the computing system generates an entry in a provisioning table. The entry is associated with the content.

Figure 10:
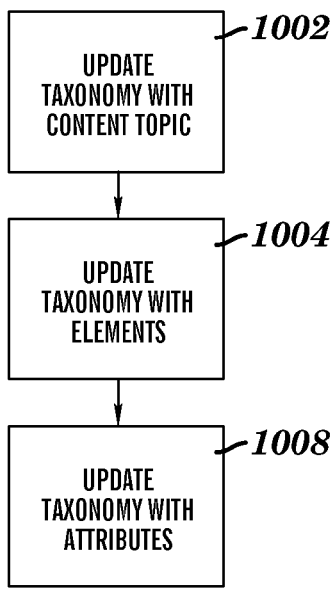

FIG. 10 illustrates a flowchart detailing step 510 of the algorithm of FIG. 5, in accordance with embodiments of the present invention. In step 1002, the computing system updates the predefined user access content mapped hierarchical taxonomy with the topic. In step 1004, the computing system updates the predefined user access content mapped hierarchical taxonomy with elements associated with the schema based structured definition. In step 1008, the computing system updates the predefined user access content mapped hierarchical taxonomy with attributes associated with the elements.

Figure 11:
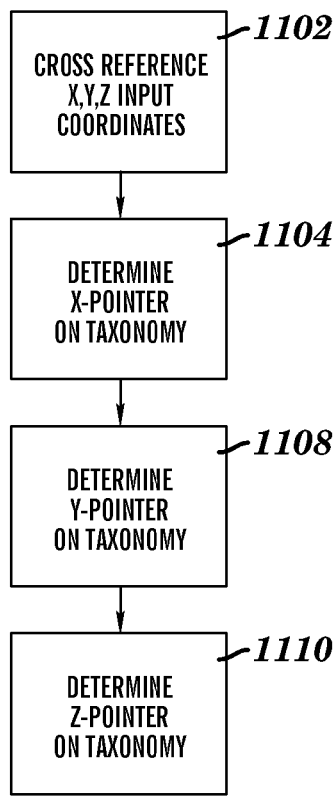

FIG. 11 illustrates a flowchart detailing step 514 of the algorithm of FIG. 5, in accordance with embodiments of the present invention. In step 1102, the computing system cross references an X-coordinate, a Y-coordinate, and a Z-coordinate (i.e., the reference coordinates). In step 1104, the computing system determines an X-pointer associated with the predefined user access content mapped hierarchical taxonomy. In step 1108, the computing system determines a Y-pointer associated with the predefined user access content mapped hierarchical taxonomy. In step 1110, the computing system determines a Z-pointer associated with the predefined user access content mapped hierarchical taxonomy.

Figure 12:
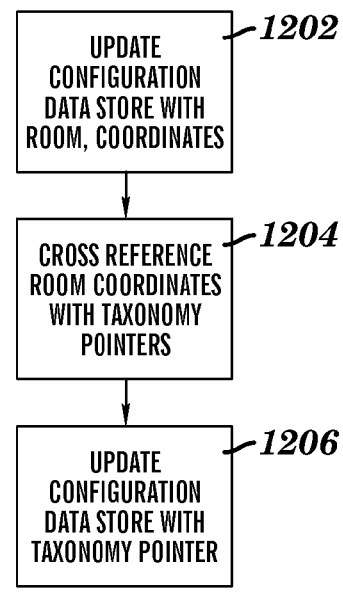

FIG. 12 illustrates a flowchart detailing step 516 of the algorithm of FIG. 5, in accordance with embodiments of the present invention. In step 1202, the configuration data is updated with coordinates for the specified logical storage room representations. In step 1204, the computing system associates the X-coordinate, the Y-coordinate, and the Z-coordinate with the X-pointer, the Y-pointer, and the Z-pointer, respectively. In step 1206, the computing system updates the configuration data with the X-pointer, the Y-pointer, and the Z-pointer.

Figures 13, 14, 15:
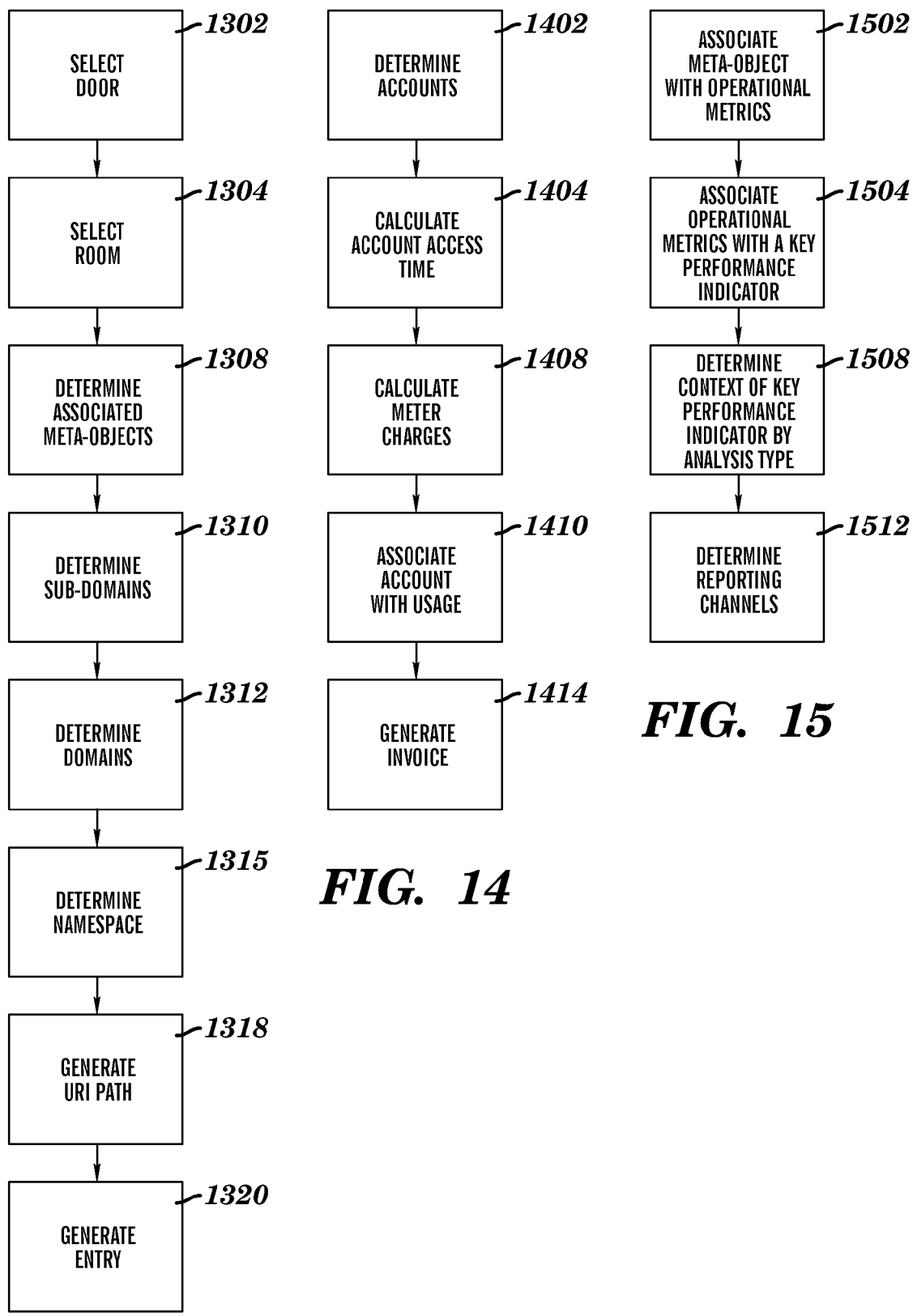

FIG. 13 illustrates a flowchart detailing step 518 of the algorithm of FIG. 5, in accordance with embodiments of the present invention. In step 1302, the computing system selects a door (i.e., an access point) associated with a specified logical storage room representation. In step 1304, the computing system selects the specified logical storage room representation. In step 1308, the computing system determines a plurality of meta-objects associated with the specified logical storage room representation. In step 1310, the computing system determines a plurality of sub-domains associated with the plurality of meta-objects. In step 1312, the computing system determines a plurality of domains associated with the plurality of sub-domains. In step 1315, the computing system determines a namespace associated with the plurality of domains. In step 1318, the computing system generates a path associated with the URI. In step 1320, the computing system generates an entry in a meta-object repository. The entry is associated with the URI.

FIG. 14 illustrates a flowchart detailing steps 520 and 522 of the algorithm of FIG. 5, in accordance with embodiments of the present invention. In step 1402, the computing system determines a plurality of accounts that have access to the specified logical storage room representation. In step 1404, the computing system calculates an account access time for a plurality of objects associated with the specified logical storage room representation. In step 1408, the computing system calculates the metering charges by multiplying the account access time by a rate charged for access to the specified logical storage room representation. In step 1410, the computing system associates the account with the usage. In step 1414, the computing system generates an invoice associated with the metering charges.

FIG. 15 illustrates a flowchart detailing step 524 of the algorithm of FIG. 5, in accordance with embodiments of the present invention. In step 1502, the computing system associates the meta-object with operational metrics. In step 1504, the computing system associates the operational metrics with a key performance indicator. In step 1508, the computing system determines a key performance indicator by an analysis type. In step 1512, the computing system determines reporting channels (and generates a report) having access to the operational metrics, the key performance indicator, and a context of said key performance indicator. The report comprises the operational metrics, the key performance indicator, and the context of the key performance indicator.

Figures 16, 17, 18:
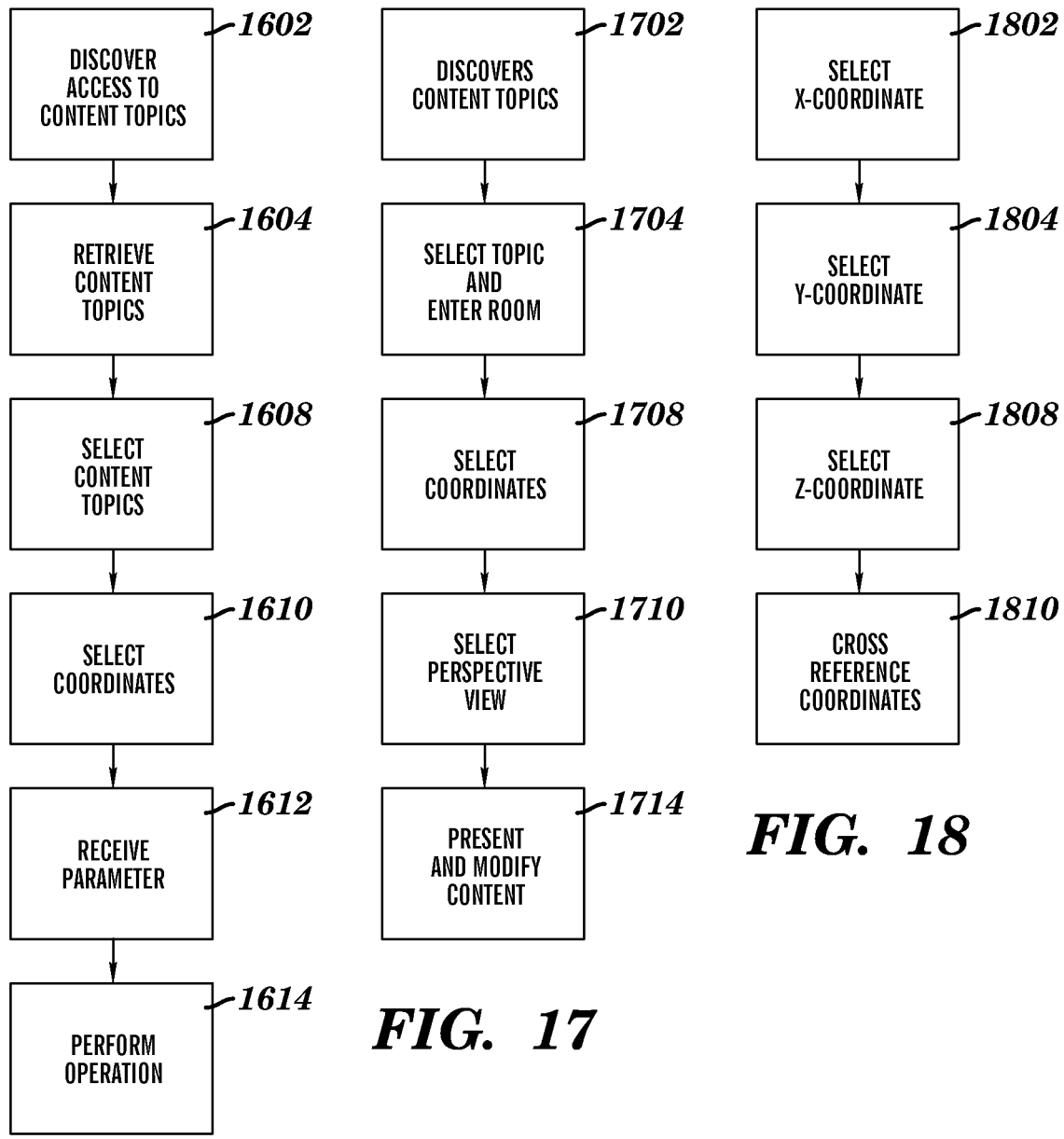
FIGS. 16-19 illustrate flowcharts detailing various steps of the algorithm of FIG. 6, in accordance with embodiments of the present invention.

FIG. 16 illustrates a flowchart detailing step 602 of the algorithm of FIG. 6, in accordance with embodiments of the present invention. In step 1602, the computing system discovers (i.e., using the API) content topics associated with the specified user accessible filter perspective content accessible by the user. In step 1604, the computing system retrieves a list comprising the content topics and associated logical storage rooms representations accessible by the user. In step 1608, the computing system selects (using the API) a first group of content topics of the content topics and a first group of logical storage rooms representations. In step 1610, the computing system selects (using the API) an X coordinate, a Y coordinate, and a Z coordinate. Each of the X coordinate, the Y coordinate, and the Z coordinate are representative by a hierarchal direction to a transverse. In step 1612, the computing system receives (using the API) a perspective parameter of the specified user accessible filter perspective content accessible by the user. In step 1614, computing system performs an allowable operation on the specified user accessible filter perspective content accessible by the user.

FIG. 17 illustrates a flowchart detailing step 604 of the algorithm of FIG. 6, in accordance with embodiments of the present invention. In step 1702, the computing system discovers content topics associated with the specified user accessible filter perspective content accessible by the user. In step 1704, the computing system receives (i.e., from the user) a selection for a first topic of the content topics and enables access to a specified logical storage room representation comprising first content. The first content is associated with the first topic. In step 1708, the computing system selects (i.e., in response to a user selection) an X coordinate, a Y coordinate, and a Z coordinate. The X coordinate, Y coordinate, and Z coordinate are each representative by a hierarchal direction to a transverse. In step 1710, the computing system selects (in response to a user selection) a perspective view for presenting the first content to the user. In step 1714, the computing system presents (to the user) the first content using the perspective view. Additionally, the computing system receives (from the user) a selection for modifying (e.g., updating or deleting) the first content and modifies accordingly.

FIG. 18 illustrates a flowchart detailing step 608 of the algorithm of FIG. 6, in accordance with embodiments of the present invention. In step 1802, the computing system selects an X coordinate referenced to the specified content. In step 1804, the computing system selects a Y coordinate referenced to the specified content. In step 1808, the computing system selects a Z coordinate referenced to the specified content. In step 1810, the computing system cross-references the X coordinate, Y coordinate, and Z coordinate to an address internal to the computing system.

Figure 19:
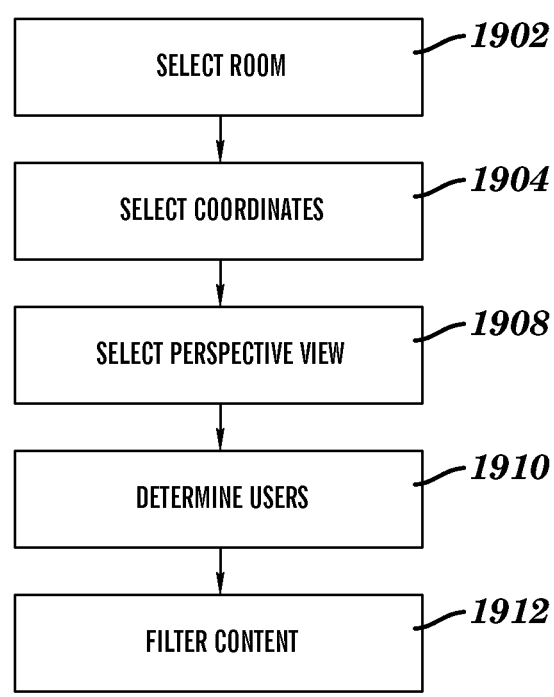

FIG. 19 illustrates a flowchart detailing step 610 of the algorithm of FIG. 6, in accordance with embodiments of the present invention. In step 1902, the computing system selects a specified storage room associated with the specified content. In step 1904, the computing system selects an X coordinate, a Y coordinate, and a Z coordinate associated with the specified content. In step 1908, the computing system selects a perspective view for presenting the specified content to the user. The perspective view is associated with the X coordinate, the Y coordinate, and the Z coordinate. In step 1910, the computing system determines all users accessing the specified content. In step 1912, the computing system filters the specified content.

Figure 20:
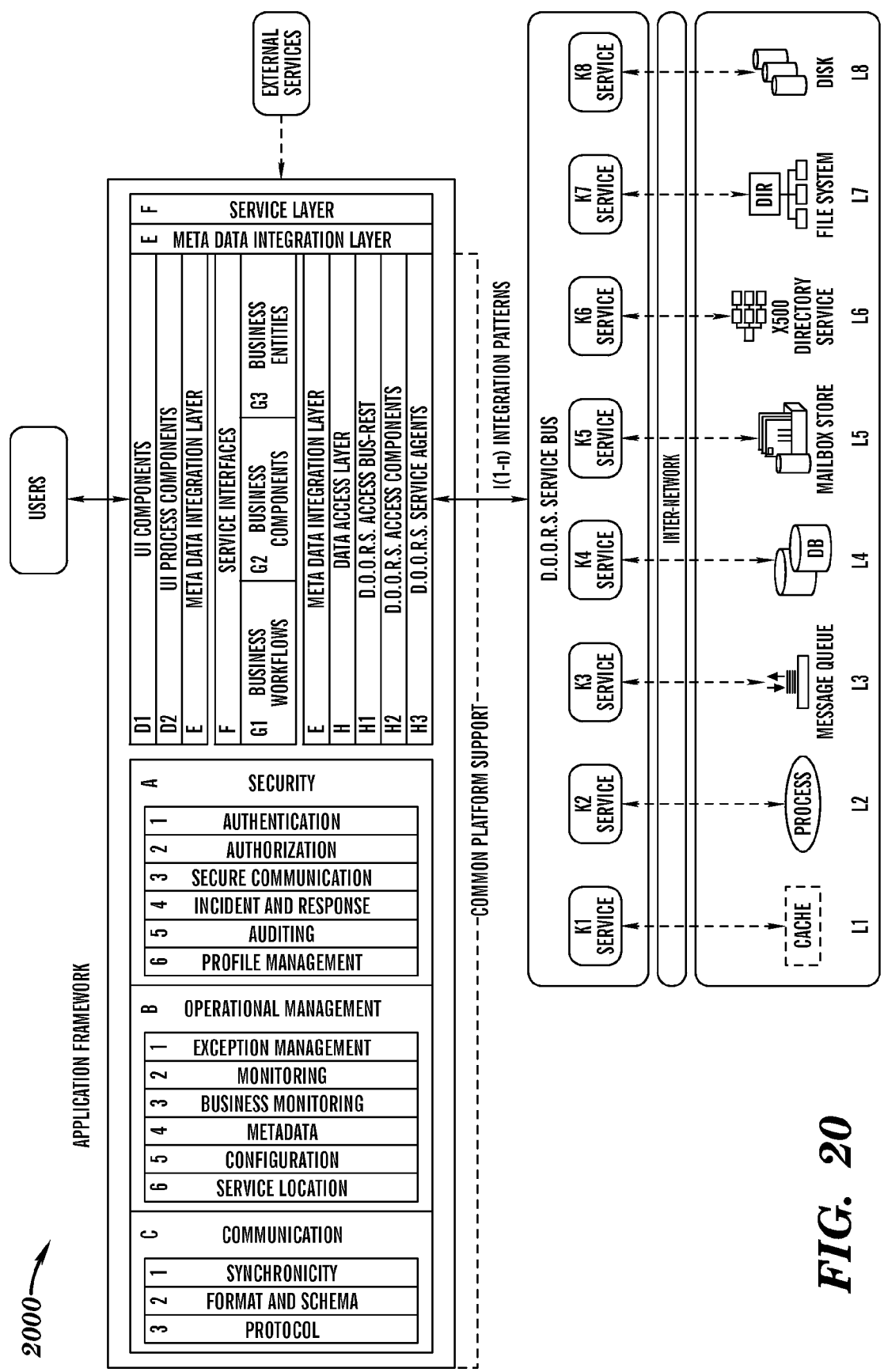
FIG. 20 illustrates an application framework implemented by the system of FIG. 1, in accordance with embodiments of the present invention.

FIG. 20 illustrates an application framework 2000 implemented by system 5 of FIG. 1, in accordance with embodiments of the present invention. Data retrieval, storage, and data resource management planning (e.g., procurement, provisioning, capacity planning, space management etc.) are each represented in separate hierarchical taxonomies. Each node on the taxonomy represents a room. The hierarchical taxonomy is segmented by its interdependency relationship intersections to other taxonomies. The taxonomies are addressable by internal REST style addressing, which represents thee hierarchical taxonomies. URI addressing invokes a DOORS system of data access components exposed as services via service agents. Each DOOR service per each type of data storage comprises a data type channel integration pattern. Therefore, by using a separate data type channel for each type of data source, all of messages on a given channel will comprise a same type of data. Additionally, the messages are carried within a standardized envelope wrapper comprising a header of operational metadata and a body comprises data services transactional data. The envelope wrapper structure provides a canonical model for all data services messages by providing a standardized metadata xml hierarchical structure for all data services message representations.

Application framework comprises the following components:

1. A security component A: The security component A comprises a suite of common services that implement a security policy enabling authentication, authorization, secure communication, auditing, and profile management as applied across all layers of the application architecture design.
2. An operational management component B: The operational management component B comprises a suite of common services that implement an operational management policy enabling ongoing, day-to-day running of the application and covers issues such as exception management, monitoring, business monitoring, metadata, configuration, and service location as applied across all layers of the application architecture design.
3. A communication management component C: The communication management component C comprises a suite of common services that implement a communication integration standards policy which defines how all components in an application will communicate with each other. The communications policy includes, inter alia, communication synchronicity, format, and protocol.
4. User interface (UI) components D1: User interface (UI) components D1 represent a user facing a presentation layer of a software architecture design. User interfaces are implemented using screens, forms, additional graphical user interfaces (GUI), or additional technology used to render and format data for users to acquire and validate data.
5. User process components D2: User process components D2 enable user interaction by driving a the process using separate user process components. Therefore, the process flow and state management logic is not hard-coded in a user interface elements themselves.
6. Metadata integration layer component E: Metadata integration layer component E represents a canonical model (standardize data exchange) integration between architectural layers.
7. Service interface component F: Service interface component F supports communication contracts (e.g., message-based communication, formats, protocols, security, exceptions, etc) required by consumers. For example, a credit card authorization service must expose a service interface that describes a functionality offered by a service and required communication semantics for calling it.
8. Business workflow component G1: Business workflow component G1 defines and coordinates long running, multi-step business processes and may be implemented using business process management tools.
9. Business components G2: Business components G2 implement business logic (e.g., implement business rules, perform business tasks, etc) of an application. For example, in a retail application, a user must implement a functionality that calculates a total price of goods ordered and add an appropriate delivery charge.
10. Business entity components G3: Business entity components G3 implement business entities using custom object-oriented classes that represent real-world entities.
11. DOORS access bus component H1: The DOORS access bus component H1 comprises an addressable service interface that exposes interesting aspects of a data set through a reference to its resources. Each resource (i.e., a meta-object) has its own unique URI. The URI is a logical link reference to an underlying accessed resource and enables an application using the DOORS data access layer, a URI interface via a DOORS application programming interface (API). The API translates a URI interface passed parameter to DOOR data access layer logical component H2 (i.e., a next layer of the DOORS data access layer).
12. DOORS data access logic components H2: DOORS data access logic components H2 allow applications and services access to a data store. DOORS data access layer logic components (H2) are intelligently aware (after a translation of a request from H1) of: what is being requested, what the user has access to, where the information is located, additional relevant information pertinent to the request, and through what perspective viewpoint it should retrieve and/or store the information to or from a plurality of storage media sources and/or physical storage locations. For example, a retail application must retrieve product data from a database to display product details to a user and insert order details into a database when a user places an order. DOORS data access logic components H2 abstracts logic necessary to access data in a separate layer of data access logic components thereby centralizing data access functionality through unique intelligent capabilities.
13. DOORS service agent component H3: DOORS service agent component H3 manages the semantics of coordinating communication between the DOORS data access layer logic components H2 and a particular remote service (e.g., when a business component must use functionality provided in an external service). For example, business components of a retail application may use a service agent to manage communication with a credit card authorization service and use a second service agent to handle conversations with a courier service. DOORS service agent component H3 isolates idiosyncrasies of calling diverse services from an remote application and provides additional services (helper service) such as, inter alia, pre-processing a basic mapping between a format of data exposed by a service and a format that an application using the DOORS Data Access Layer requires.

14. Integration pattern component I: Integration pattern component I represents how (low level design methods deployed) to establish integration between a data access layer and a DOORS service bus component J1.
15. A DOORS service bus component J1: A DOORS service bus component J1 provides an abstraction layer on top of an implementation of an enterprise event-driven and standards-based messaging engine. A DOORS service bus component J1 provides common services such as, inter alia, mediation, intelligent routing, transformation, and protocol bridging.
16. Cache L1 comprises a CPU attached memory.
17. Process component L2 a separate instanced memory resident CPU set of instruction enablement.
18. Message queue L3 comprises a coordination of persisting and passing of control of stacked message content.
19. Database L4 comprises a collection of information that is organized for easy access and management. Database L4 is updated via storage tables.
20. Mailbox L5 comprises an electronic post office storage of email messages.
21. X.500 directory services L6 comprises a single directory information tree (DIT). A DIT comprises a hierarchical organization of entries distributed across one or more servers.
22. File system L7 comprises instructions for enabling a method for storing and organizing computer files and data contained in directories and subdirectories.
23. Disk L8 comprises electronic storage consisting of magnetic media comprising tracks, sectors, and cylinders partitioned and indexed for convenient data retrieval.

Figure 21:
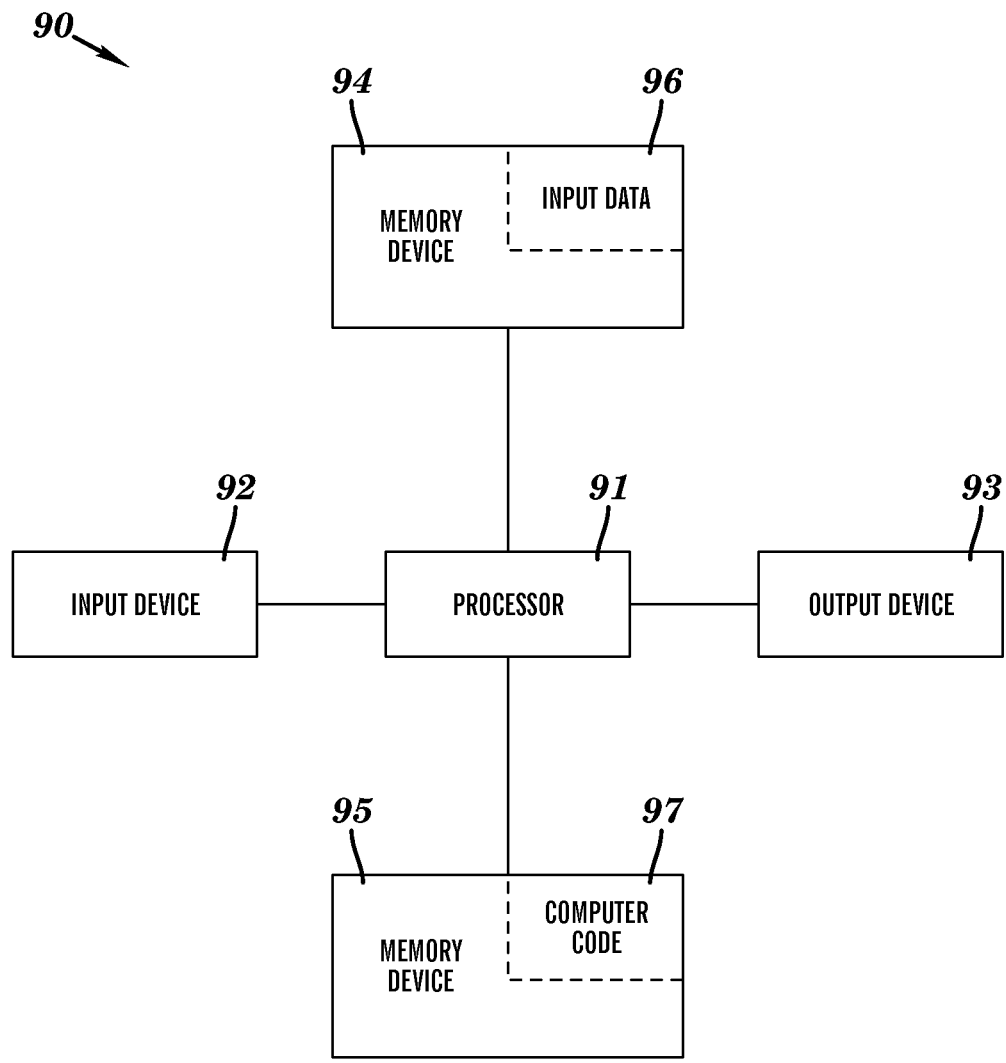
FIG. 21 illustrates a computer apparatus for storing and retrieving distributed data, in accordance with embodiments of the present invention.

FIG. 21 illustrates a computer apparatus 90 (e.g., computing system 10 of FIG. 1) used for storing and retrieving distributed data, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 5-19) for storing and retrieving distributed data. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 21) may comprise the algorithms of FIGS. 5-19 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to for store and retrieve distributed data. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for storing and retrieving distributed data. In another embodiment, the invention provides a business method that performs the process steps of the invention on a subscription, advertising, and/or fee basis. That is, a service provider, such as a Solution Integrator, could offer to store and retrieve distributed data. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 21 shows the computer system 90 as a particular configuration of hardware and software, any configuration of hardware and software, as would be known to a person of ordinary skill in the art, may be utilized for the purposes stated supra in conjunction with the particular computer system 90 of FIG. 21. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:
1. A method comprising:
defining, by a computing system, a user accessible meta-object referencing contextual content, wherein said user accessible meta-object comprises a functional operation referenced object, a service referenced object, or a content specific referenced object;
defining, by said computing system from a schema based structured definition for said user accessible meta-object, a predefined user access content mapped hierarchical taxonomy and a configuration data map associated with said predefined user access content mapped hierarchical taxonomy;
creating, by a processor of said computing system, required content for said computing system, wherein said content comprises user accessible contextual content associated with said predefined user access content mapped hierarchical taxonomy;
associating, by said computing system, user accessible topics of relevant tangible content of said content with specified logical storage room representations, wherein each storage room of said specified logical storage room representations comprises contextual content storage address spaces;
generating, by said computing system, a searchable record entry associated with said user accessible topics and said specified logical storage room representations;
associating, by said computing system, reference coordinates with said predefined user access content mapped hierarchical taxonomy, wherein said reference coordinates are associated with said specified logical storage room representations;

determining, by said computing system, a change associated with a relative point of view associated with each node of said predefined user access content mapped hierarchical taxonomy;

updating, by said computing system, said configuration data map, wherein said updating said configuration data map comprises generating updated configuration data, wherein said updated configuration data comprises reference coordinate pointers pointing to the contextual content storage address spaces, and wherein the contextual content storage address spaces are comprised by a plurality of different storage mediums and a plurality of different physical storage locations;

generating, by said computing system, a uniform resource identifier (URI) associated with said content enabling a direct internal access mapping to the contextual content storage address spaces associated with reference coordinate pointers;

determining, by said computing system, metering charges for usage of an account per paid subscription to the user accessible contextual content;

applying, by said computing system, key performance indicators to transactional analysis usage patterns of said user accessible contextual content;

presenting, by said computing system via a dashboard view, analysis of a generated report associated with said account, said transactional analysis usage patterns, and said usage.

2. The method of claim 1, wherein said defining said user accessible meta-object comprises:
   defining, by said computing system, a namespace for said user accessible meta-object;
   defining, by said computing system, a domain for said namespace;
   defining, by said computing system, a sub-domain associated with said domain;
   classifying, by said computing system, a type for said user accessible meta-object;
   defining, by said computing system, attributes for said user accessible meta-object; and
   defining, by said computing system, URI mapping data associated with said URI.

3. The method of claim 1, wherein said defining said schema based structured definition comprises:
   defining, by said computing system, elements associated with said schema based structured definition; and
   defining, by said computing system, attributes associated with said elements.

4. The method of claim 1, wherein said determining that content is required comprises:
   determining, by said computing system, a content type for said content;
   determining, by said computing system, a sub-domain associated with said user accessible meta-object;
   determining, by said computing system, a domain associated with said sub-domain;
   determining, by said computing system, a namespace associated with said domain; and
   generating, by said computing system, an entry in a provisioning table, wherein said entry is associated with said content.

5. The method of claim 1, wherein said creating said content comprises:
   updating, by said computing system, said predefined user access content mapped hierarchical taxonomy with said topic;
   updating, by said computing system, said predefined user access content mapped hierarchical taxonomy with elements associated with said schema based structured definition; and
   updating, by said computing system, said predefined user access content mapped hierarchical taxonomy with attributes associated with said elements.

6. The method of claim 1, wherein said associating said user accessible topics of relevant tangible content with said specified logical storage room representations comprises:
   determining, by said computing system, if said specified logical storage room representations exist.

7. The method of claim 1, wherein said reference coordinate pointers comprise an X-coordinate, a Y-coordinate, and a Z-coordinate, and wherein said associating said reference coordinates with said predefined user access content mapped hierarchical taxonomy comprises:
   determining, by said computing system, an X-pointer associated with said predefined user access content mapped hierarchical taxonomy;
   determining, by said computing system, a Y-pointer associated with said predefined user access content mapped hierarchical taxonomy; and
   determining, by said computing system, a Z-pointer associated with said predefined user access content mapped hierarchical taxonomy.

8. The method of claim 7, wherein said updating said configuration data comprises:
   associating, by said computing system, said X-coordinate, said Y-coordinate, and said Z-coordinate with said X-pointer, said Y-pointer, and said Z-pointer, respectively.

9. The method of claim 1, wherein said generating said URI comprises:
   selecting, by said computing system, access point doors associated with said specified logical storage room representations;
   selecting, by said computing system, a first logical storage room representation of said specified logical storage room representations;
   determining, by said computing system, a plurality of meta-objects associated with said first logical storage room representation;
   determining, by said computing system, a plurality of sub-domains associated with said plurality of meta-objects;
   determining, by said computing system, a plurality of domains associated with said plurality of sub-domains;
   determining, by said computing system, a namespace associated with said plurality of domains;
   generating, by said computing system, a path associated with said URI; and
   generating, by said computing system, an entry in a meta-object repository, wherein said entry is associated with said URI.

10. The method of claim 1, wherein said generating said account comprises:
    associating, by said computing system, said account to a plurality of objects for access; and
    associating, by said computing system, said account to said user.

11. The method of claim 1, wherein said determining said metering charges comprises:
    determining, by said computing system, a plurality of accounts that have access to said specified logical storage room representations;
    calculating, by said computing system, an account access time for a plurality of objects associated with said specified logical storage room representations;
    calculating, by said computing system, said metering charges by multiplying said account access time by a rate charged for access to said specified logical storage room representations;
    associating, by said computing system, said account with said usage; and
    generating, by said computing system, an invoice associated with said metering charges.

12. The method of claim 1, wherein said generating said report comprises:
    associating, by said computing system, said meta-object with operational metrics;
    associating, by said computing system, said operational metrics with a key performance indicator;
    determining, by said computing system, a key performance indicator by an analysis type; and
    determining, by said computing system, reporting channels having access to said operational metrics, said key performance indicator, and a context of said key performance indicator, wherein said report comprises said operational metrics, said key performance indicator, and said context of said key performance indicator.

13. The method of claim 1, wherein said reference coordinates are associated with a hardware infrastructure reference storage of said content or a general user specific storage of said content.

14. A process for supporting computer infrastructure, said process comprising providing at least one support service for at least one of creating, integrating, hosting, maintaining, and deploying computer-readable code in a computing system, wherein the code in combination with the computing apparatus is capable of performing the method of claim 1.

15. A computing apparatus comprising a processor coupled to a computer-readable memory unit, said memory unit comprising instructions that when executed by the processor implements a method comprising:
    defining, by said computing system, a user accessible meta-object referencing contextual content, wherein said user accessible meta-object comprises a functional operation referenced object, a service referenced object, or a content specific referenced object;
    defining, by said computing system from a schema based structured definition for said user accessible meta-object, a predefined user access content mapped hierarchical taxonomy and a configuration data map associated with said predefined user access content mapped hierarchical taxonomy;
    creating, by a processor of said computing system, required content for said computing system, wherein said content comprises user accessible contextual content associated with said predefined user access content mapped hierarchical taxonomy;
    associating, by said computing system, user accessible topics of relevant tangible content of said content with specified logical storage room representations, wherein each storage room of said specified logical storage room representations comprises contextual content storage address spaces;
    generating, by said computing system, a searchable record entry associated with said user accessible topics and said specified logical storage room representations;
    associating, by said computing system, reference coordinates with said predefined user access content mapped hierarchical taxonomy, wherein said reference coordinates are associated with said specified logical storage room representations;
    determining, by said computing system, a change associated with a relative point of view associated with each node of said predefined user access content mapped hierarchical taxonomy;
    updating, by said computing system, said configuration data map, wherein said updating said configuration data map comprises generating updated configuration data, wherein said updated configuration data comprises reference coordinate pointers pointing to the contextual content storage address spaces, and wherein the contextual content storage address spaces are comprised by a plurality of different storage mediums and a plurality of different physical storage locations;
    generating, by said computing system, a uniform resource identifier (URI) associated with said content enabling a direct internal access mapping to the contextual content storage address spaces associated with reference coordinate pointers;
    determining, by said computing system, metering charges for usage of an account per paid subscription to the user accessible contextual content;
    applying, by said computing system, key performance indicators to transactional analysis usage patterns of said user accessible contextual content;
    presenting, by said computing system via a dashboard view, analysis of a generated report associated with said account, said transactional analysis usage patterns, and said usage.

16. The computing apparatus of claim 15, wherein said defining said user accessible meta-object comprises:
    defining, by said computing system, a namespace for said user accessible meta-object;
    defining, by said computing system, a domain for said namespace;
    defining, by said computing system, a sub-domain associated with said domain;
    classifying, by said computing system, a type for said user accessible meta-object;
    defining, by said computing system, attributes for said user accessible meta-object; and
    defining, by said computing system, URI mapping data associated with said URI.

17. The computing apparatus of claim 15, wherein said defining said schema based structured definition comprises:
    defining, by said computing system, elements associated with said schema based structured definition; and
    defining, by said computing system, attributes associated with said elements.

18. The computing apparatus of claim 15, wherein said determining that content is required comprises:
    determining, by said computing system, a content type for said content;
    determining, by said computing system, a sub-domain associated with said user accessible meta-object;
    determining, by said computing system, a domain associated with said sub-domain;
    determining, by said computing system, a namespace associated with said domain; and generating, by said computing system, an entry in a provisioning table, wherein said entry is associated with said content.

19. The computing apparatus of claim 15, wherein said creating said content comprises:
updating, by said computing system, said predefined user access content mapped hierarchical taxonomy with said topic;
updating, by said computing system, said predefined user access content mapped hierarchical taxonomy with elements associated with said schema based structured definition; and
updating, by said computing system, said predefined user access content mapped hierarchical taxonomy with attributes associated with said elements.

20. A computer program product, comprising a computer readable storage device storing a computer readable program code, said computer readable program code configured to perform method upon being executed by a computer processor of a computing system, said method comprising:
defining, by said computing system, a user accessible meta-object referencing contextual content, wherein said user accessible meta-object comprises a functional operation referenced object, a service referenced object, or a content specific referenced object;
defining, by said computing system from a schema based structured definition for said user accessible meta-object, a predefined user access content mapped hierarchical taxonomy and a configuration data map associated with said predefined user access content mapped hierarchical taxonomy;
creating, by a processor of said computing system, required content for said computing system, wherein said content comprises user accessible contextual content associated with said predefined user access content mapped hierarchical taxonomy;
associating, by said computing system, user accessible topics of relevant tangible content of said content with specified logical storage room representations, wherein each storage room of said specified logical storage room representations comprises contextual content storage address spaces;
generating, by said computing system, a searchable record entry associated with said user accessible topics and said specified logical storage room representations;
associating, by said computing system, reference coordinates with said predefined user access content mapped hierarchical taxonomy, wherein said reference coordinates are associated with said specified logical storage room representations;
determining, by said computing system, a change associated with a relative point of view associated with each node of said predefined user access content mapped hierarchical taxonomy;
updating, by said computing system, said configuration data map, wherein said updating said configuration data map comprises generating updated configuration data, wherein said updated configuration data comprises reference coordinate pointers pointing to the contextual content storage address spaces, and wherein the contextual content storage address spaces are comprised by a plurality of different storage mediums and a plurality of different physical storage locations;
generating, by said computing system, a uniform resource identifier (URI) associated with said content enabling a direct internal access mapping to the contextual content storage address spaces associated with reference coordinate pointers;
determining, by said computing system, metering charges for usage of an account per paid subscription to the user accessible contextual content;
applying, by said computing system, key performance indicators to transactional analysis usage patterns of said user accessible contextual content;
presenting, by said computing system via a dashboard view, analysis of a generated report associated with said account, said transactional analysis usage patterns, and said usage.

* * * * *